Patented Apr. 1, 1924.  1,489,021

UNITED STATES PATENT OFFICE.

JAMES G. STAFFORD, OF CHICAGO, ILLINOIS, AND ROBERT H. GARDNER, OF WHITING, AND ERNEST B. PHILLIPS, OF EAST CHICAGO, INDIANA, ASSIGNORS TO SINCLAIR REFINING COMPANY, OF CHICAGO, ILLINOIS, A CORPORATION OF MAINE.

PREPARATION OF METAL CHLORIDES.

No Drawing.   Application filed December 16, 1921.   Serial No. 522,788.

*To all whom it may concern:*

Be it known that we, JAMES G. STAFFORD, ROBERT H. GARDNER, and ERNEST B. PHILLIPS, citizens of the United States, residing, respectively, at Chicago, county of Cook, State of Illinois, Whiting, county of Lake, State of Indiana, and East Chicago, county of Lake, State of Indiana, have invented certain new and useful Improvements in Preparation of Metal Chlorides, of which the following is a specification.

The invention relates more particularly to the preparation of chlorides from oxygen-containing ores, such as the oxides, silicates and the like, and in its broader aspect consists in the use of chloride of sulfur for the purpose. It is applicable to the ores of a large number of the metals but is particularly valuable in connection with the preparation of aluminum chloride from the oxides and silicates. In the following specification I have chosen to exemplify the invention by a description of the method of preparing aluminum chloride from its silicates and more particularly from Florida earth of floridin, which is especially advantageous for the purpose because of the relatively small content of iron.

The invention is independent of any particular form of apparatus and in the following specification I have described it as carried out in apparatus composed of well-known units properly assembled for the purpose.

In the usual dry processes for the recovery of metals in the form of their chlorides carbon has been the reducing agent commonly employed for removing the oxygen associated with the metals therefrom and such processes have generally involved the heating of the ores with carbon and the passing of chlorine therethrough. Both the carbon and chlorine in such processes are presented to the ores in the molecular and, therefore, relatively inactive condition. By the use of mono-chlorid of sulfur for the purpose of reducing the ores the sulfur and chlorine are presented in nascent condition and, therefore, act much more energetically upon the ores the sulfur seizing the oxygen of them and releasing the chlorine in the nascent state. Furthermore, sulfur furnishes a more efficient reducing agent under the particular conditions of the reaction for the reason that at the temperatures employed it is quadrivalent whereas carbon is divalent, the former therefore combining with two atoms of oxygen to form a stable gas, whereas the latter combines with but one. Furthermore, the by-products of the reaction are more valuable and available for commercial use where a sulfur compound is employed than if carbon is the reducing agent. Preferably the sub-chlorid of sulfur ($S_2Cl_2$) is used as it may be readily and cheaply made by well known processes, but other of the numerous chlorides of sulfur may be used instead of or in connection with the sub-chlorid.

In carrying out the process, in order to avoid waste of the reagent the ore is preferably dried. This may be done, if for example floridin or fuller's earth is used, by heating the ore or earth to a full red heat (about 1500 to 1800 degrees F.). After substantially all the water is thus removed the ore is treated simultaneously with chloride of sulfur and chlorine at a high temperature, as for example at approximately full red heat. The sulfur combines with the oxygen of the ore, forming sulfur-dioxid and the chlorine, both that released from the chloride of sulfur and that supplied in the gaseous state, combine with the metal and, where the ore is a silicate with the silicon thereof, forming vapors of the metal chloride of the metal of the ore and silicon tetrachlorid. All of these products, above mentioned, are gases or vapors at the temperatures employed and pass off from the treating chamber as such and intermingled. The products may be separated in any desired way. We have found it convenient to first condense the metal chloride by a suitable lowering of the temperature of the gases in a condenser, and then condense the remaining mixture of gases by compression or refrigeration or by a combination thereof and then separate the two compounds by fractional distillation. Thus the silicon tetrachlorid and sulfur dioxide may be recovered in substantially pure condition and either used as such or converted into the commercial products. If desired the silicon tetrachlorid can be passed into water in which event, if the recovery of the sulfur dioxide and silicon tetrachlorid as above described is not desired, the gases from the furnace, after the separation of the aluminum chloride may be passed directly into water the sulfur dioxide dissolving therein and the silicon tetrachlorid reacting with the water to form amorphous silica and hydrochloric acid, the former of which precipitates and the latter goes into solution. The amorphous silica may be separated by driving off the water by heat or otherwise and forms a valuable by-product, particularly because of its purity, which enables it to be used for a variety of industrial purposes, such as the making of glass, as an absorbent for gases, etc.

We will now describe a typical operation of the process as applied to the recovery of aluminum chloride from earths containing it, in the form of silicate, such as floridin.

An electric furnace was employed in the operation to be described, though any other type of furnace in which the desired temperature can be obtained, may be used. The floridin was charged into a quartz tube and heated to a full red heat (about 1500 to 1800 degrees F.) in the electric furnace. A stream of air, previously dried in a well known manner, was forced through the earth in the tube until an examination showed that the moisture was substantially eliminated. The temperature of the ore was substantially maintained at full red heat and chloride of sulfur and chlorine were supplied thereto. In the specific example of the practice of the process which we are now describing, the tube containing the earth was connected to a branch fitting through one branch of which liquid sulfur chloride was permitted to trickle into the tube and through the other branch previously dried gaseous chlorine was forced. The sub-chlorid was used in this operation and the supply thereof and of chlorine was so regulated that neither of these substances could be detected in the gases flowing from the tube. A double decomposition took place, the sulfur in nascent condition combining with the oxygen of the earth and the chlorine, both that supplied in the form of a gas and that released from the chloride of sulfur, the latter being in nascent condition, combined with the aluminum and silicon of the earth to form the volatile chlorides of these elements. The reaction may be represented as follows:

$$4Al_2O_3 \cdot 2SiO_2 \text{ plus } 7S_2Cl_2 = 4Al_2Cl_6 \text{ plus } 8SiCl \text{ plus } 14SO_2.$$

At the temperatures employed all of the products of the reaction are in the gaseous phase. The chloride of sulfur and chlorine being continuously supplied a constant stream of the gaseous products was given off and was first led through an iron condensing chamber connected to the tube wherein the aluminum chloride, which has the highest boiling point of the products was condensed. The uncondensed products were then led through a connected series of vessels containing water. The silicon tetrachlorid and water underwent double decomposition, forming hydro-chloric acid and amorphous silica, the reaction being represented by the following equation:

$$8SiCl_4 \text{ plus } 16H_2O = 8SiO_2 \text{ plus } 32HCl.$$

The sulfur dioxide went into solution as sulfurous acid. Substantially all of the silicon tetrachlorid was converted in the first of the containers and as the liquid in this container became too heavy and viscous it was removed and a new container substituted.

As above stated the process is applicable to other ores of aluminum besides the silicate, it may be applied to bauxite or other aluminum oxides, though in this case there would be no formation of silicon tetrachlorid or silica, and the amount of chlorin employed would be correspondingly reduced. Again, as heretofore stated, the process is applicable to the formation of other chlorides than aluminum chloride. It is particularly useful in the treatment of low-grade ores of precious and semi-precious metals. The temperature of reaction employed would depend upon the particular metal or ore to which the process is applied and on the temperature of volatilization of the chloride formed.

All of the reagents used in the reaction may be recovered except so much of the chlorin as combines with the metal to form the chloride thereof.

We claim:

1. A method of forming chlorides from metal ores containing oxygen which consists in heating the ores in an atmosphere containing chloride of sulfur.

2. A process of making metal chlorides from the ores thereof containing oxygen consisting in heating such ores in the presence of chlorin and sulfur chloride.

3. A process of making metal chlorides from silicates consisting in heating the silicates in the presence of chloride of sulfur.

4. A process of forming chlorides of metal from their ores containing oxygen, which consists in heating the ores in the presence of chloride of sulfur to a temperature at which said metal chlorides are volatile and condensing the chlorides from the volatile products.

5. A method of making metal chlorides from the silicates of such metals which consists in heating the ores in the presence of mono-chlorid of sulfur to a temperature at which said metal chlorides formed are volatile and condensing the metal chlorides from the gaseous product.

6. A method of making aluminum chloride from its oxygen-containing ores consisting in heating the ores in the presence of chloride of sulfur, and condensing the aluminum chloride so formed.

7. A process of making aluminum chloride from its silicate ores, consisting in heating said ores in the presence of chloride of sulfur and condensing the chloride of aluminum formed.

8. A process of making aluminum chloride from its silicate ores consisting in heating said ores in the presence of chloride of sulfur and chlorine and separating the chloride of aluminum from the vapors formed.

9. A process of making aluminum chloride from its oxygen containing ores consisting in heating the ores in the presence of chloride of sulfur and chlorine and separating the aluminum chloride from the vapors formed.

10. A process of making aluminum chloride from its oxygen containing ores consisting in heating the ores in the presence of mono-chlorid of sulfur and separating the aluminum chloride from the vapors formed.

11. A method of making aluminum chloride from its oxygen containing ores consisting in heating the ores in the presence of mono-chlorid of sulfur and chlorine, vaporizing the chloride of aluminum formed and condensing the vapors.

12. Method of making aluminum chloride from its silicate ores consisting in heating the ores in the presence of chloride of sulfur, condensing the aluminum chloride formed, separately condensing the remaining condensable gases and vapors, and separating the constituents of the last named condensate by distillation.

JAMES G. STAFFORD.
ROBERT H. GARDNER.
ERNEST B. PHILLIPS.